(12) United States Patent
Moroguchi et al.

(10) Patent No.: US 11,338,371 B2
(45) Date of Patent: May 24, 2022

(54) CUTTING INSERT

(71) Applicant: SUMITOMO ELECTRIC HARDMETAL CORP., Itami (JP)

(72) Inventors: Hironari Moroguchi, Itami (JP); Satoru Kukino, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 326 days.

(21) Appl. No.: 16/344,193

(22) PCT Filed: Aug. 2, 2018

(86) PCT No.: PCT/JP2018/029026
§ 371 (c)(1),
(2) Date: Apr. 23, 2019

(87) PCT Pub. No.: WO2019/087496
PCT Pub. Date: May 9, 2019

(65) Prior Publication Data
US 2020/0338645 A1 Oct. 29, 2020

(30) Foreign Application Priority Data

Oct. 31, 2017 (JP) ............................. JP2017-210514

(51) Int. Cl.
*B23B 27/14* (2006.01)

(52) U.S. Cl.
CPC ...... *B23B 27/145* (2013.01); *B23B 2200/242* (2013.01); *B23B 2222/16* (2013.01); *B23B 2226/125* (2013.01); *B23B 2226/18* (2013.01)

(58) Field of Classification Search
CPC ...... B23B 2200/242; B23B 2200/3609; B23B 2200/3654; B23B 2200/201; B23B 27/145
See application file for complete search history.

(56) References Cited

U.S. PATENT DOCUMENTS

| 5,006,020 A | * | 4/1991 | Roos | ..................... B23B 27/145 |
| | | | | 407/113 |
| 2006/0188347 A1 | | 8/2006 | Kratz | |
| 2016/0297010 A1 | | 10/2016 | Kukino et al. | |

FOREIGN PATENT DOCUMENTS

| CN | 106424788 A | 2/2017 |
| EP | 1066903 A2 | 1/2001 |
| JP | 08-155702 A | 6/1996 |
| JP | 2002-192407 A | 7/2002 |
| JP | 2015-091627 A | 5/2015 |
| WO | 94/25208 A1 | 11/1994 |
| WO | 2016/043127 A1 | 3/2016 |

* cited by examiner

*Primary Examiner* — Alan Snyder
(74) *Attorney, Agent, or Firm* — Baker Botts L.L.P.; Michael A. Sartori

(57) ABSTRACT

A cutting insert has a surface that relates to cutting, the surface comprising cBN sintered material, ceramics, or cermet. The cutting insert comprises: a rake face; a flank face; a chamfer located between the rake face and the flank face; and a cutting edge formed by a ridgeline at which the flank face and the chamfer intersect. The cutting edge comprises a cutting edge portion for push cutting, a cutting edge portion for pull cutting, and a connecting cutting edge portion located between the cutting edge portion for push cutting and the cutting edge portion for pull cutting. In the chamfer located along the cutting edge, the chamfer located along the connecting cutting edge portion has a minimum width.

5 Claims, 27 Drawing Sheets

FIG.19
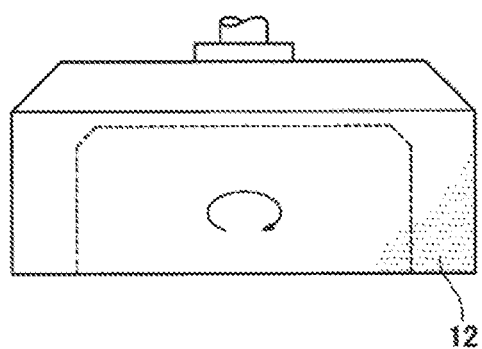
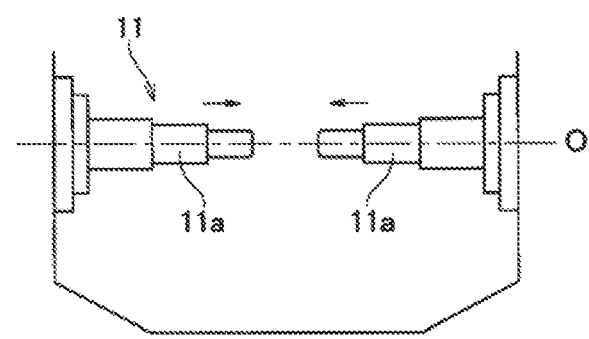

CUTTING INSERT

TECHNICAL FIELD

The present disclosure relates to a cutting insert. The present application claims priority to Japanese Patent Application No. 2017-210514 filed on Oct. 31, 2017, the disclosure of which is hereby incorporated by reference in its entirety.

BACKGROUND ART

A cutting insert including hard sintered material as a cutting edge is used for machining a high hardness difficult-to-cut material, such as a hardened steel and a heat-resistant alloy. In such a cutting insert, the angle and width of a chamfer (negative land) formed in the edge is determined in accordance with the hardness and component of the difficult-to-cut material, the shape of the workpiece to be machined, and the required accuracy of dimension.

WO 2016/043127 (PTL 1) discloses a cutting insert including a negative land having a non-uniform width for prolonging the life of the insert and providing a machining surface excellent in surface texture. In this cutting insert, the ridgeline at which the negative land and the rake face intersect is not parallel to the ridgeline at which the negative land and the flank face intersect, in plan view. In the cutting insert, at least on one side with respect to the apex of the nose R portion cutting edge, the width of the negative land, which is non-uniform in width, gradually decreases from the apex of the nose R portion cutting edge toward the position at which the nose R portion cutting edge is continuous with the straight cutting edge.

Japanese Patent Laying-Open No. 2002-192407 (PTL 2) discloses a cutting tool chamfered along the arc-shaped cutting edge of the nose for prolonging the life of the tool without compromising the finished surface roughness. In this cutting tool, the chamfer width in the arc-shaped cutting edge, as seen from the rake face side, gradually increases from the vicinities of the connection points between the arc-shaped cutting edge and the two straight cutting edges that define the nose, toward the substantially middle point of the arc of the arc-shaped cutting edge.

CITATION LIST

Patent Literature

PTL 1: WO 2016/043127
PTL 2: Japanese Patent Laying-Open No. 2002-192407

SUMMARY OF INVENTION

A cutting insert in one aspect of the present disclosure is a cutting insert having a surface that relates to cutting, the surface comprising cBN sintered material, ceramics, or cermet. The cutting insert comprises: a rake face; a flank face; a chamfer located between the rake face and the flank face; and a cutting edge formed by a ridgeline at which the flank face and the chamfer intersect. The cutting edge comprises a cutting edge portion for push cutting, a cutting edge portion for pull cutting, and a connecting cutting edge portion located between the cutting edge portion for push cutting and the cutting edge portion for pull cutting. In the chamfer located along the cutting edge, the chamfer located along the connecting cutting edge portion has a minimum width.

BRIEF DESCRIPTION OF DRAWINGS

FIG. 19 is a plan view showing principal portions of an example of a grinder used for manufacturing a cutting insert in one aspect of the present disclosure.

DESCRIPTION OF EMBODIMENTS

Figure 1:
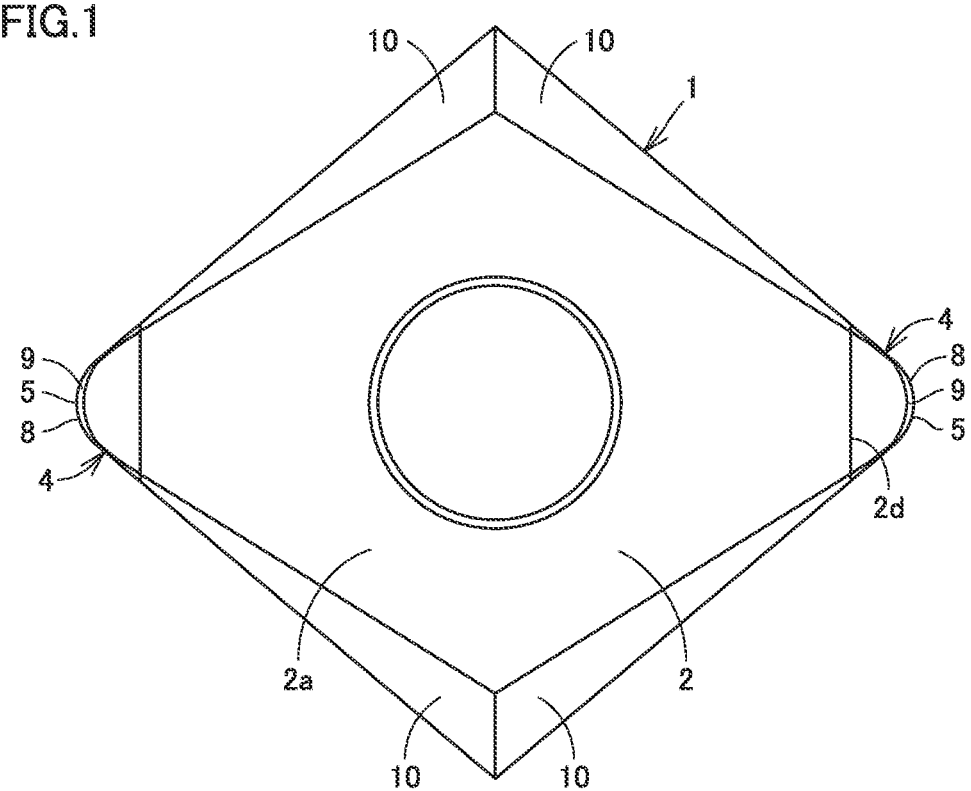
FIG. 1 is a plan view showing an example of a cutting insert in one aspect of the present disclosure.

Problems to be Solved by the Disclosure

In recent years, in order to shorten the machining time and improve the machining accuracy, there has been a demand for a cutting insert capable of pull cutting, in addition to push cutting.

The cutting inserts (cutting tools) in PTL 1 and PTL 2 are intended only for push cutting. Therefore, when these cutting inserts (cutting tools) are used for pull cutting, the contact length between the cutting edge and a workpiece will be long, which tends to cause a high cutting resistance. Further, when the cutting inserts (cutting tools) in PTL 1 and PTL 2 are used for pull cutting, a narrow-width portion of chamfer (negative land) will serve as a lateral cutting edge portion. Accordingly, the lateral cutting edge portion is subject to chipping and fracture, which may shorten the tool life.

Thus, an object of the present disclosure is to provide a cutting insert having a long tool life and capable of machining with high accuracy of dimension for both push cutting and pull cutting of a high hardness difficult-to-cut material, such as a hardened steel, a sintered alloy, and a heat-resistant alloy.

Advantageous Effect of the Disclosure

According to the above-described aspect, a cutting insert can be provided having a long tool life and capable of machining with high accuracy of dimension for both push cutting and pull cutting of a high hardness difficult-to-cut material, such as a hardened steel, a sintered alloy, and a heat-resistant alloy.

Description of Embodiments of the Disclosure

First of all, embodiments of the present disclosure are listed and described.

[1] A cutting insert in one aspect of the present disclosure has a surface that relates to cutting, the surface comprising cBN sintered material, ceramics, or cermet. The cutting insert comprises: a rake face; a flank face; a chamfer located between the rake face and the flank face; and a cutting edge formed by a ridgeline at which the flank face and the chamfer intersect. The cutting edge comprises a cutting edge portion for push cutting, a cutting edge portion for pull cutting, and a connecting cutting edge portion located between the cutting edge portion for push cutting and the cutting edge portion for pull cutting. In the chamfer located along the cutting edge, the chamfer located along the connecting cutting edge portion has a minimum width.

In this specification, the surface that relates to cutting, the connecting cutting edge portion, the cutting edge portion for push cutting, and the cutting edge portion for pull cutting refer to the following regions.

The surface that relates to cutting refers to the region in contact with a workpiece during cutting, and the region within 2 mm from the former region along the surface of the cutting insert.

The connecting cutting edge portion refers to a region of the cutting edge, the region being adjacent to a chamfer whose width is minimum in the entire chamfer located along the cutting edge. The cutting edge portion for push cutting refers to a region of the cutting edge, the region being located between the apex of the cutting edge of the nose R portion and the connecting cutting edge portion. The cutting edge portion for pull cutting refers to a region of the cutting edge, the region extending from the connecting cutting edge portion in the direction away from the nose R portion.

First, the influence of the cutting resistance on the cutting edge when turning is performed with the cutting insert is described with reference to FIG. 22 to FIG. 26.

Figure 22:
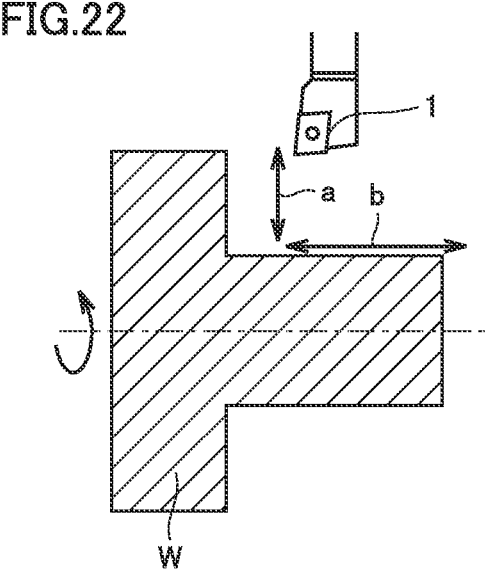
FIG. 22 is a schematic diagram showing the positional relationship between the cutting insert and a workpiece in end face machining and outer-periphery machining in turning.

FIG. 22 is a schematic diagram showing the positional relationship between the cutting insert and a workpiece in turning. In FIG. 22, the direction indicated by the arrow a represents end face machining, and the direction indicated by the arrow b represents outer-periphery machining.

Figure 23:
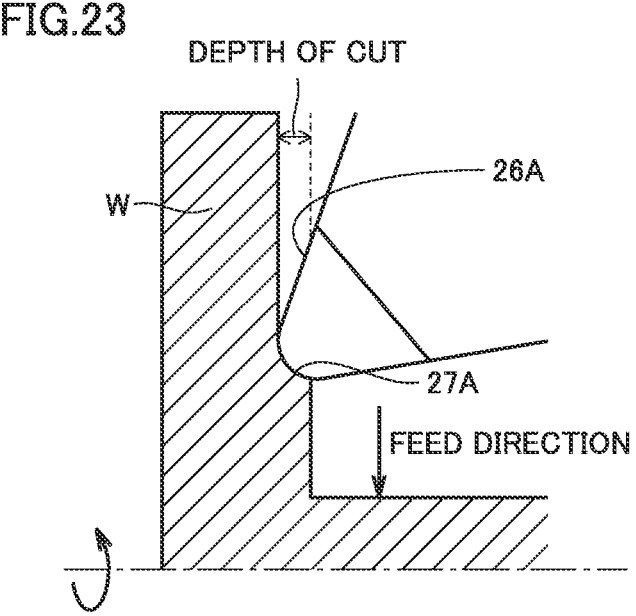
FIG. 23 is a schematic diagram showing the positional relationship among the front cutting edge portion, the lateral cutting edge portion, and a workpiece in push cutting in end face machining.
Figure 24:
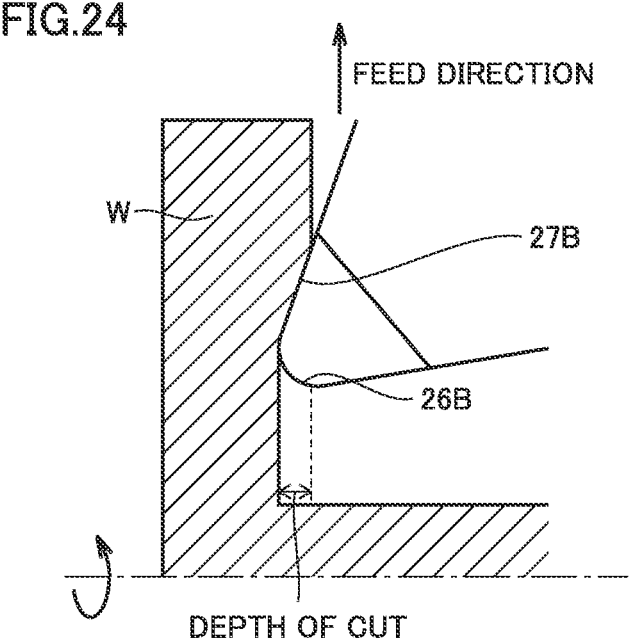
FIG. 24 is a schematic diagram showing the positional relationship among the front cutting edge portion, the lateral cutting edge portion, and a workpiece in pull cutting in end face machining.

When the cutting insert is used for push cutting in end face machining, the thrust force component of the cutting resistance is applied to a front cutting edge portion 26A, and the feed force component of the cutting resistance is applied to a lateral cutting edge portion 27A, as shown in FIG. 23. When the cutting insert is used for pull cutting in end face machining, on the other hand, the thrust force component of the cutting resistance is applied to a front cutting edge portion 26B, and the feed force component of the cutting resistance is applied to a lateral cutting edge portion 27B, as shown in FIG. 24.

Figure 25:
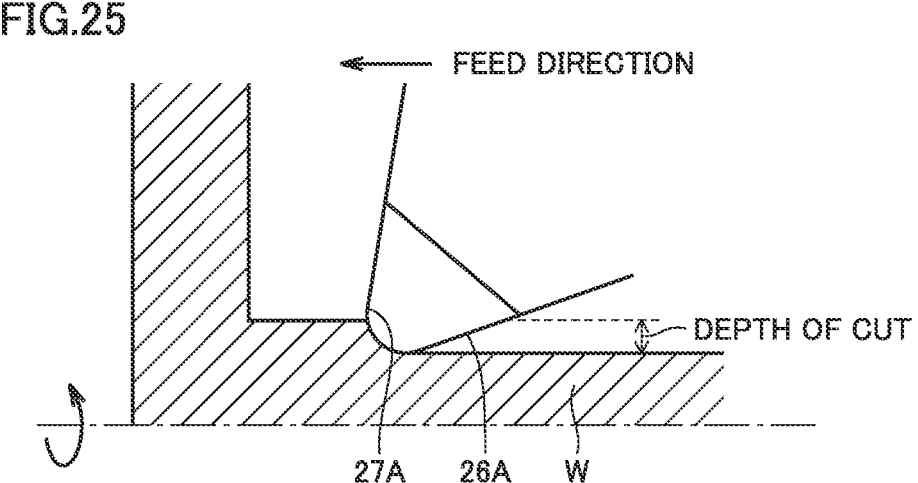
FIG. 25 is a schematic diagram showing the positional relationship among the front cutting edge portion, the lateral cutting edge portion, and a workpiece in push cutting in outer-periphery machining.
Figure 26:
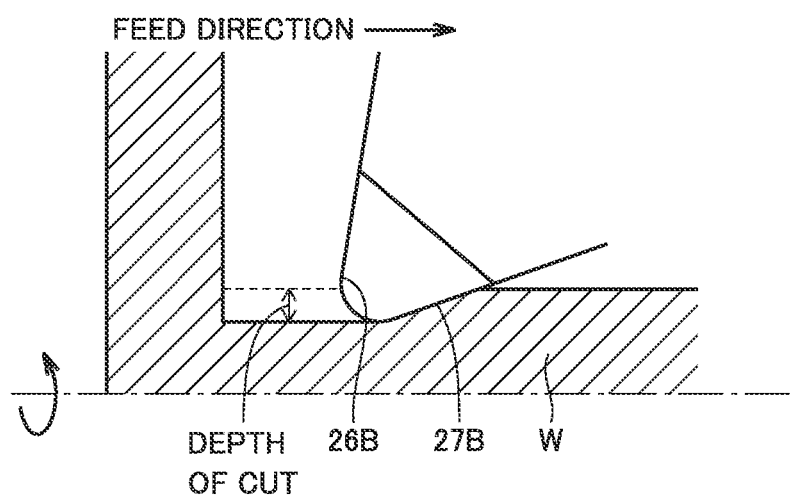
FIG. 26 is a schematic diagram showing the positional relationship among the front cutting edge portion, the lateral cutting edge portion, and a workpiece in pull cutting in outer-periphery machining.

When the cutting insert is used for push cutting in outer-periphery machining in turning, the thrust force component of the cutting resistance is applied to front cutting edge portion 26A, and the feed force component of the cutting resistance is applied to lateral cutting edge portion 27A, as shown in FIG. 25. When the cutting insert is used for pull cutting in turning, on the other hand, the thrust force component of the cutting resistance is applied to front cutting edge portion 26B, and the feed force component of the cutting resistance is applied to lateral cutting edge portion 27B, as shown in FIG. 26.

If the thrust force component of the cutting resistance applied to front cutting edge portions 26A, 26B of the cutting insert is high, the cutting insert is subject to chattering and affected layer, which have a bad influence on the properties of the machining surface. If the feed force component of the cutting resistance applied to lateral cutting edge portions 27A, 27B is high, the lateral cutting edge is subject to chipping and fracture.

In a cutting insert in one aspect of the present disclosure, the width of chamfer located along the connecting cutting edge portion (i.e., a part of front cutting edge portions 26A, 26B that is subjected to a great thrust force component) is narrowly designed. Accordingly, in both push cutting and pull cutting, the thrust force component to be applied to the front cutting edge portion is reduced. This reduces generation of chattering and affected layer in the cutting insert during machining, and improves the properties and accuracy of dimension of the machining surface.

At the same time, in a cutting insert in one aspect of the present disclosure, the width of chamfer located along the cutting edge portion for push cutting and the cutting edge portion for pull cutting (i.e., a part constituting lateral cutting edge portions 27A, 27B) is widely designed. Accordingly, the lateral cutting edge portion is strengthened. This can reduce generation of chipping and fracture in the cutting insert during machining and prolong the life of the cutting insert, whether it is used for push cutting or pull cutting.

[2] Preferably, width W1 of the chamfer located along the connecting cutting edge portion is not less than 0.02 mm and not more than 0.3 mm. Width W1 within this range can effectively reduce generation of chattering and affected layer that would be caused by increase in thrust force component of cutting resistance. Since vibration due to increase in cutting resistance is suppressed, generation of chipping and fracture in the lateral cutting edge can be reduced due to low vibration of the cutting tool.

[3] Preferably, the maximum value W2 of width of the chamfer located along the cutting edge portion for push cutting, and the width W1 satisfy the relationship in formula (1) below:

$$1.2 \leq W2/W1 \leq 10 \qquad \text{formula (1)}.$$

[4] Preferably, the maximum value W3 of width of the chamfer located along a region within 1.5 mm from the connecting cutting edge portion along the cutting edge portion for pull cutting, and the width W1 satisfy the relationship in formula (2) below:

$$1.2 \leq W3/W1 \leq 10 \qquad \text{formula (2)}.$$

Width W1 and maximum value W2 of width of the chamfer located along the cutting edge portion for push cutting (hereinafter also referred to as "maximum value W2 of width") and maximum value W3 of width of the chamfer located along the region within 1.5 mm from the connecting cutting edge portion along the cutting edge portion for pull cutting (hereinafter also referred to as "maximum value W3 of width") satisfying formula (1) or formula (2) described above can improve the fracture resistance to the feed force component at the lateral cutting edge portion, reduce the thrust force component at the front cutting edge portion and thus reduce vibration and affected layer, and prevent chattering, in good balance.

[5] Preferably, the rake face has a positive rake angle, and the rake angle is not less than 1° and not more than 10°, at a cross section bisecting the apex angle of a nose R portion. Setting the rake angle to this range can more effectively prevent chattering and improve the fracture resistance of the edge.

[6] Preferably, the cutting insert comprises a cutter material and a base metal, the cutter material comprises cBN sintered material, ceramics, or cermet, and the cutter material comprises the rake face, the flank face, the chamfer, and the cutting edge. Accordingly, the use of cBN sintered material, ceramics, or cermet, which is an expensive material, is limited to the cutter material. Thus, the cutting insert is advantageous in terms of cost.

[7] Preferably, the distance along the cutting edge portion for push cutting between the apex of the cutting edge of a nose R portion and the connecting cutting edge portion is not less than 0.1 mm and not more than 3.0 mm, and the length of the connecting cutting edge portion is not more than 2.0 mm. This can more effectively prevent chattering and improve the fracture resistance of the edge.

Details of Embodiments of the Disclosure

A specific example of a cutting insert in one embodiment of the present disclosure is hereinafter described with reference to the drawings.

Embodiment 1

A cutting insert 1 shown in FIG. 1 to FIG. 8 is formed by joining a small-piece cutter material 4, which is made of any of cBN sintered material, ceramics, and cermet, to each acute angle corner portion of a base metal 2, which is rhombic in plan view. In the present embodiment, cutter material 4 made of hard sintered material is joined to each acute angle corner portion of base metal 2. However, the entire cutting insert may be made of hard sintered material.

Figure 7:
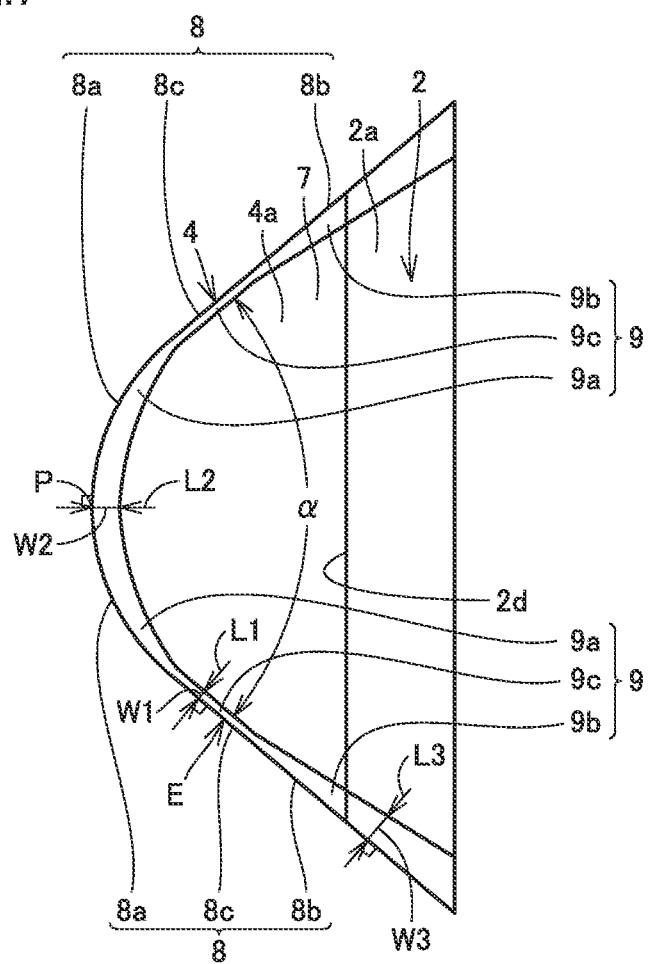
FIG. 7 is an enlarged plan view around the nose R portion the cutting insert in
FIG. 1.

The cutting insert in the present embodiment may also be applied to a polygonal cutting insert, other than a rhombic one. However, since the feature of the cutting edge profile is common, only a rhombic cutting insert is shown as an example here. For easy understanding of the cutting edge profile, FIG. 7 shows a nose R portion with a large radius.

Base metal 2 is made of cemented carbide, cermet, or the like. Each acute angle corner portion of base metal 2 has a seat 3 formed by partially recessing the upper face of the acute angle corner portion. Cutter material 4 having a nose R portion 5 is joined to seat 3 by a joining means, such as brazing.

Cutter material 4 is made of any of cBN sintered material, ceramics, and cermet. The cBN sintered material refers to a sintered material containing 10% to 99.9% by volume of cBN (cubic boron nitride). The ceramics may be, but is not limited to, alumina ($Al_2O_3$), silicon nitride ($Si_3N_4$), and titanium carbide (TiC), as suitable examples. The cermet may be, but is not limited to, nitride cermet and carbide cermet, as suitable examples.

Cutter material 4 includes a rake face 7 formed by grinding, a flank face 6 formed by grinding, a chamfer 9 that is non-uniform in width and located between rake face 7 and flank face 6, and a cutting edge 8 formed by the ridgeline at which flank face 6 and chamfer 9 intersect. That is, cutter material 4 is made of cBN sintered material, ceramics, or cermet, and includes rake face 7, flank face 6, chamfer 9, and cutting edge 8.

Cutting edge 8 includes a cutting edge portion 8a for push cutting, a cutting edge portion 8b for pull cutting, and a connecting cutting edge portion 8c located between cutting edge portion 8a for push cutting and cutting edge portion 8b for pull cutting.

Cutting edge portion 8a for push cutting includes a curved cutting edge ridgeline of the nose R portion. The nose R portion has a round shape having a bend radius of not more than 2.4 mm in plan view.

Cutting edge portion 8b for pull cutting and connecting cutting edge portion 8c include straight cutting edge ridgelines continuous with both ends of cutting edge portion 8a for push cutting. The term "straight" as used herein refers not only to a straight cutting edge in the strict sense. If it is a curve having such a large bend radius as to exceed ten times (24 mm) greater than the maximum bend radius (2.4 mm) of the cutting edge ridgeline of the nose R portion, the cutting edge ridgeline fulfills the same function as a straight edge that provides a proper surface roughness as a front cutting edge. Therefore, an edge having such a profile is regarded as a straight edge.

The length of cutting edge portion 8b for pull cutting along the straight cutting edge ridgeline extending from the contact point with connecting cutting edge portion 8c is preferably not less than 1.5 mm and not more than 3.0 mm, and more preferably not less than 1.5 mm and not more than 2.5 mm, for example.

The distance between the apex of the cutting edge of the nose R portion and the connecting cutting edge portion along the cutting edge portion for push cutting is preferably not less than 0.1 mm and not more than 3.0 mm, and the length of the connecting cutting edge portion is preferably not more than 2.0 mm. This prevents chattering effectively and improves the fracture resistance of the edge. If the connecting cutting edge portion has a certain length as shown in FIG. 7, the distance between the apex of the nose R portion cutting edge and the connecting cutting edge portion along the cutting edge portion for push cutting refers to the distance between the apex of the nose R portion cutting edge and the end of the connecting cutting edge portion adjacent to the nose R portion, along the cutting edge portion for push cutting.

The distance between the apex of the nose R portion cutting edge and the connecting cutting edge portion along the cutting edge portion for push cutting is more preferably not less than 0.1 mm and not more than 2.8 mm, and still more preferably not less than 0.5 mm and not more than 2.5 mm.

If the connecting cutting edge portion has a certain length, the length of connecting cutting edge portion 8c along the straight cutting edge ridgeline is preferably not less than 0.05 mm and not more than 1.5 mm, and more preferably not less than 0.05 mm and not more than 1.0 mm, for example. Alternatively, connecting cutting edge portion 8c may be formed by the boundary between cutting edge portion 8a for push cutting and cutting edge portion 8b for pull cutting (i.e., a point representing a position with no length).

Chamfer 9 is formed by grinding, like flank face 6. As shown in FIG. 7, the width of chamfer 9 is maximum at the apex P of cutting edge portion 8a for push cutting in a chamfer 9a located along cutting edge portion 8a for push cutting (hereinafter also referred to as "chamfer 9a for push cutting"). The width gradually decreases from apex P toward a chamfer 9c located along connecting cutting edge portion 8c (hereinafter also referred to as "connecting chamfer 9c", and is minimum at connecting chamfer 9c. The width of a chamfer 9b located along cutting edge portion 8b for pull cutting (hereinafter also referred to as "chamfer 9b for pull cutting") gradually increases with distance from connecting chamfer 9c.

In the cutting insert shown in FIG. 7, both of the two chamfers extending from the nose R portion have a width increasing and decreasing as described above. However, only one of the two chamfers that relates to cutting may have a width increasing and decreasing as described above.

Figure 8:
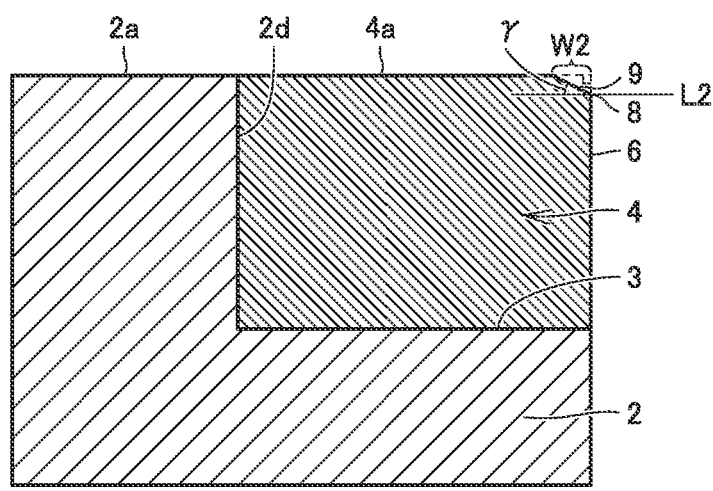
FIG. 8 is an enlarged view of the portion indicated by VIII in FIG. 4.

The width of chamfer refers to the width of chamfer in the direction of a perpendicular (L1, L3 in FIG. 7) to the cutting edge 8 ridgeline in plan view of the rake face (when the cutting insert is seen from the rake face side). If the cutting edge is curved, the width of chamfer refers to the width in the direction of a perpendicular (L2 in FIG. 7) to a tangent to the cutting edge ridgeline. For example, as shown in FIG. 7 and FIG. 8, width W2 of the chamfer for push cutting at apex P of the nose R portion is defined as the width of chamfer on perpendicular L2 in plan view of the rake face, the perpendicular L2 being a line perpendicular to a tangent to the cutting edge portion for push cutting at apex P. The width of chamfer can be measured with a profile measurement device (contracer).

Width W1 of connecting chamfer 9c is preferably not less than 0.02 mm and not more than 0.3 mm. Width W1 of less than 0.02 mm would easily cause chipping and fracture during machining. Width W1 of more than 0.3 mm, on the other hand, would easily increase the cutting resistance during machining. Width W1 is more preferably not less than 0.05 mm and not more than 0.25 mm, and still more preferably not less than 0.05 mm and not more than 0.15 mm. If the connecting cutting edge portion has a certain length, width W1 of connecting chamfer 9c located along connecting cutting edge portion 8c is a constant value.

In the cutting insert shown in FIG. 7, the width of chamfer 9a for push cutting gradually decreases from apex P toward connecting chamfer 9c. However, the decreasing of the width is not limited to monotone decreasing. For example, the width of chamfer 9a for push cutting may be the maximum value at apex P, then repeatedly gradually decrease and/or gradually increase with distance from apex P, and then reach connecting chamfer 9c. Alternatively, the width of chamfer 9a for push cutting may decrease step-wise from apex P, and then reach connecting chamfer 9c. The position in chamfer 9a for push cutting that has maximum value W2 is not limited to apex P, but may be a portion that will receive a large feed force component, for example. Specifically, a portion of chamfer that is located along the region within 2.8 mm from apex P along the cutting edge portion for push cutting may have maximum value W2 of width of the chamfer for push cutting.

Maximum value W2 of width of chamfer 9a for push cutting is preferably not less than 0.05 mm and not more than 0.50 mm. Maximum value W2 of width of less than 0.05 mm would easily cause chipping and fracture during machining. Maximum value W2 of width of more than 0.50 mm, on the other hand, would easily increase the cutting resistance during machining. The maximum value W2 of width of chamfer 9a for push cutting is more preferably not less than 0.05 mm and not more than 0.40 mm, and still more preferably not less than 0.05 mm and not more than 0.30 mm.

Maximum value W2 of width of chamfer 9a for push cutting and width W1 of connecting chamfer 9c preferably satisfy the relationship in formula (1) below.

$$1.2 \leq W2/W1 \leq 10 \qquad \text{formula (1)}$$

Width W1 and maximum value W2 of width satisfying the relationship in the above formula (1) improve the fracture resistance to the feed force component at the lateral cutting edge portion, reduce the thrust force component at the front cutting edge portion and thus reduce generation of vibration and affected layer, and prevent chattering, in good balance. Width W1 and maximum value W2 of width further preferably satisfy the relationships in formula (1-1) and formula (1-2) below.

$$1.2 \leq W2/W1 \leq 8 \qquad \text{formula (1-1)}$$

$$1.2 \leq W2/W1 \leq 6 \qquad \text{formula (1-2)}$$

In the cutting insert shown in FIG. 7, the width of chamfer 9b for pull cutting gradually increase with distance from connecting chamfer 9c. However, the increasing of the width is not limited to monotone increasing. For example, the width of chamfer 9b for pull cutting may gradually increase with distance from connecting chamfer 9c, then gradually decrease, and then further gradually increase. Alternatively, the width of chamfer 9b for pull cutting may increase step-wise with distance from connecting chamfer 9c.

In a portion of chamfer that is located along the region within 1.5 mm from connecting cutting edge portion 8c along cutting edge portion 8b for pull cutting, the minimum value of width of chamfer 9b for pull cutting is preferably greater than width W1 of connecting chamfer 9c, and maximum value W3 of width of chamfer 9b for pull cutting is preferably not less than 0.05 mm and not more than 0.50 mm. Here, if the connecting cutting edge portion has a length, the region within 1.5 mm from the connecting cutting edge portion along the cutting edge portion for pull cutting refers to the region within 1.5 mm from the end of the connecting cutting edge portion at the boundary with the cutting edge portion for pull cutting, along the cutting edge portion for pull cutting. Alternatively, if the connecting cutting edge portion is formed by the boundary between cutting edge portion for push cutting and cutting edge portion for pull cutting, it refers to the region within 1.5 mm from this boundary along the cutting edge portion for pull cutting.

Maximum value W3 of width of less than 0.05 mm would easily cause chipping and fracture during machining. Maximum value W3 of width of more than 0.50 mm would easily increase the cutting resistance during machining. Maximum value W3 of width of chamfer 9b for pull cutting is more preferably not less than 0.05 mm and not more than 0.4 mm, and still more preferably not less than 0.05 mm and not more than 0.3 mm.

Maximum value W3 of width of chamfer 9b for pull cutting and width W1 of connecting chamfer 9c preferably satisfy the relationship in formula (2) below.

$$1.2 \leq W3/W1 \leq 10 \quad \text{formula (2)}$$

Width W1 and maximum value W3 of width satisfying the relationship in the above formula (2) improve the fracture resistance to the feed force component at the lateral cutting edge portion, reduce the thrust force component at the front cutting edge portion and thus reduce generation of vibration and affected layer, and prevent chattering, in good balance. Width W1 and maximum value W3 of width further preferably satisfy the relationships in formula (2-1) and formula (2-2) below.

$$1.2 \leq W3/W1 \leq 8 \quad \text{formula (2-1)}$$

$$1.2 \leq W3/W1 \leq 6 \quad \text{formula (2-2)}$$

As shown in FIG. 8, angle γ of the chamfer to a line parallel with top face 2a at the cross section bisecting the apex angle of the nose R portion is preferably not less than 5° and not more than 45°, and still more preferably not less than 15° and not more than 35°. Setting the angle of the chamfer to this range can both reduce chattering and improve the fracture resistance of the edge.

In a cutting insert in one aspect of the present disclosure, the radius of the nose R portion may be set to not less than 0.4 mm and not more than 2.4 mm, and apex angle α of the nose R portion may be set to not less than 30° and not more than 95°. The apex angle of the nose R portion as used herein is equal to the angle between the two sides defining the nose R portion in plan view of the side of the cutting insert that relates to cutting.

The radius of the nose R portion is specified by ISO standards. The values of standard are set in 0.2 mm increments from 0.4 mm to 2.4 mm, among which any one of 0.8 mm, 1.2 mm, and 1.6 mm is preferable for a good balance between the cutting resistance and the edge strength.

Apex angle α of nose R portion is also the numerical value specified by ISO standards. Among the values of standard, any one of 35°, 55°, 60°, 80°, and 90° is preferable for a good balance between the cutting resistance and the edge strength.

Figure 27:
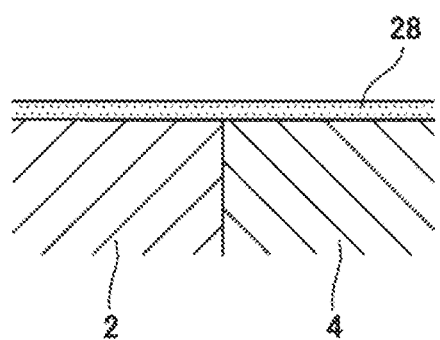
FIG. 27 is a cross-sectional view of a cutting insert including a covering layer in one aspect of the present disclosure.

A cutting insert in one aspect of the present disclosure may include a covering layer 28 as shown in FIG. 27. Covering layer 28 is preferably made of a carbide, nitride, boride, carbonitride, boron nitride, or oxide of Ti, Al, Si, Cr, W, Mo, Nb, Ta, and Zr because such a layer provides excellent adhesion resistance or abrasion resistance.

Next, an example of a method for manufacturing a cutting insert in one aspect of the present disclosure is described. In this manufacturing method, a blank material is held, in the thickness direction, by a chuck of a grinder whose position and attitude are controllable. In this state, a cutter material is pressed against the end face of a rotating grinding wheel of the grinder, so as to form a flank face, a chamfer, and a rake face in the cutter material by grinding. Thus, a cutting insert is produced. The details are described below.

Figure 17:
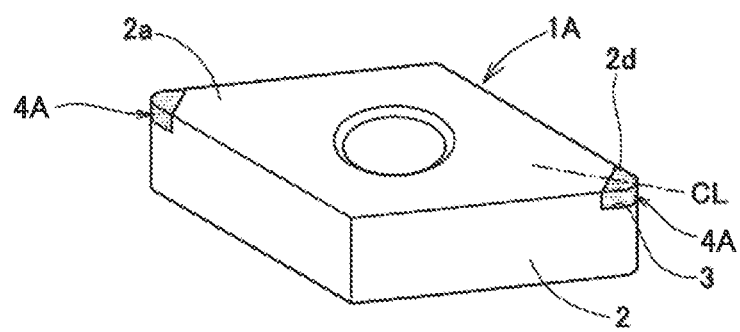
FIG. 17 is a perspective view showing an example of a blank material of a cutting insert in one aspect of the present disclosure.
Figure 18:
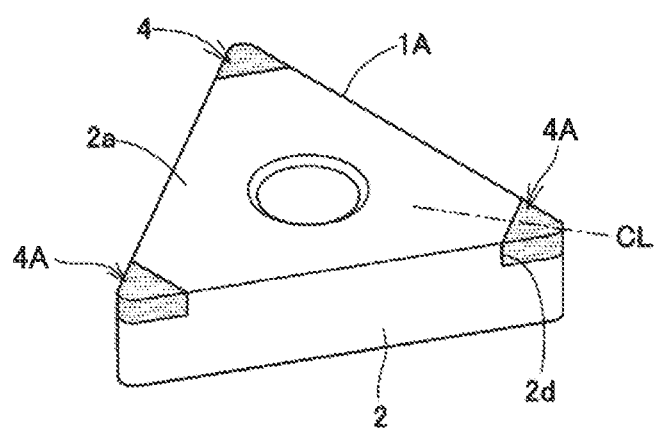
FIG. 18 is a perspective view showing another example of a blank material of a cutting insert in one aspect of the present disclosure.

First, an example of blank material to be finished by grinding is shown in FIG. 17 and FIG. 18. Blank material 1A in FIG. 17 is a rhombic cutting insert precursor formed by joining a small-piece cutter material precursor 4A made of any of cBN sintered material, ceramics, and cermet, to seat 3 at each acute angle corner portion of top face 2a of base metal 2 made of cemented carbide or ceramics.

Blank material 1A in FIG. 18 is a triangular cutting insert precursor formed by joining the above-described small-piece cutter material precursor 4A to seat 3 at each corner portion on top face 2a of base metal 2 made of cemented carbide or ceramics.

A cutting insert manufactured by grinding such blank materials may include a single small-piece cutter material precursor 4A provided at only one corner portion.

This manufacturing method may also be applied to cutting inserts different in shape from the examples shown above, such as rhombic cutting inserts having different corner angles, polygonal cutting inserts having four or more corners, negative-type cutting inserts where cutter materials are joined to corner portions on the upper and lower sides of base metal, and cutting inserts formed by base metal and cutter material precursor integrally with the same material.

Base metal 2 includes a joint surface 2d perpendicular to the bisector CL of the edge corner portion. Base metal 2 is configured to receive a cutting thrust force at joint surface 2d.

Finish grinding for blank material 1A is common regardless of the shape of the cutting insert. The following description takes finish grinding for blank material 1A shown in FIG. 17 (rhombic cutting insert precursor) as an example.

In this manufacturing method, grinding is performed using a grinder including a chuck whose position and attitude are controllable. For example, an NC grinder includes a chuck 11 as shown in FIG. 19, for which numerical control of the position and attitude can be performed, and a grinding wheel 12 that rotates at a fixed position.

Carrying blank material 1A to and from this grinder and passing blank material 1A to chuck 11 are performed with, for example, a position-controlled robot hand (not shown).

Although grinding wheel 12 shown in the drawing is a cup grinding wheel, a disc-shaped grinding wheel may be used for grinding. A smooth grinding wheel 12 of #600 or more is suitable.

Figure 20:
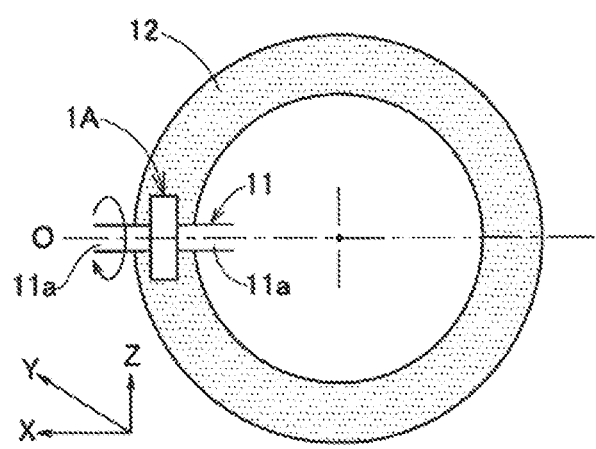
FIG. 20 is a front view showing a motion of a chuck of a grinder.
Figure 21:
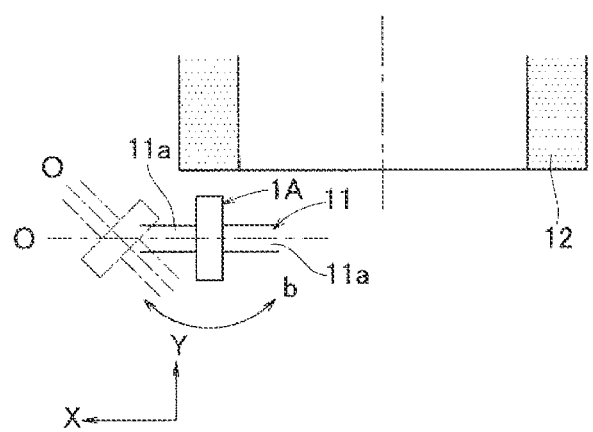
FIG. 21 is a plan view showing a motion of the chuck of the grinder.

The grinder has a function of four-axis control shown in FIG. 20 and FIG. 21, i.e., moves the chuck in the X-axis direction and the Y-axis direction, rotates chuck 11 around the axis O, and turns chuck 11 in the b-axis direction in FIG. 21 (chuck 11 does not move in the Z-axis direction).

Chuck 11 includes a pair of plug gauges 11a facing each other and replaceable with ones with other sizes. Plug gauges appropriate to the model number of the cutting insert to be machined are used to hold base metal 2 of blank material 1A (which has been carried by a robot hand to a fixed position) therebetween in the thickness direction. The plug gauges hold base metal 2 with its top face and bottom face as reference positions.

By controlling the position and attitude of chuck 11, cutter material precursor 4A joined to a corner portion of base metal 2 is pressed against the end face of rotating grinding wheel 12, thus forming the above-described nose R portion 5, flank face 6, chamfer 9, and rake face 7 in cutter material precursor 4A by grinding.

Grinding of flank face 6 can be performed by pressing a portion (which will be formed into a flank face) of the outer periphery of blank material 1A held by chuck 11 against the end face of grinding wheel 12, and by rotating chuck 11 around axis O in this state, as shown in FIG. 20.

Figure 2:
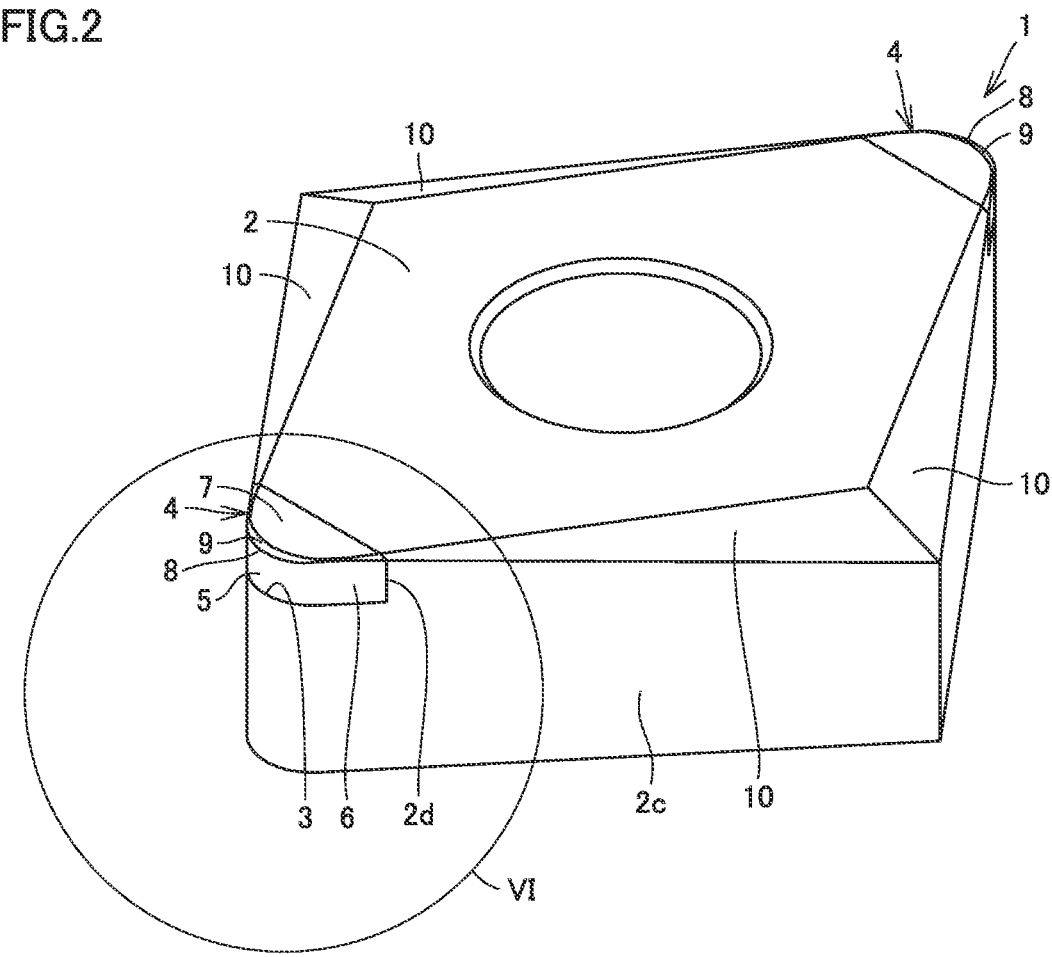
FIG. 2 is a perspective view of the cutting insert in FIG. 1.
Figure 3:
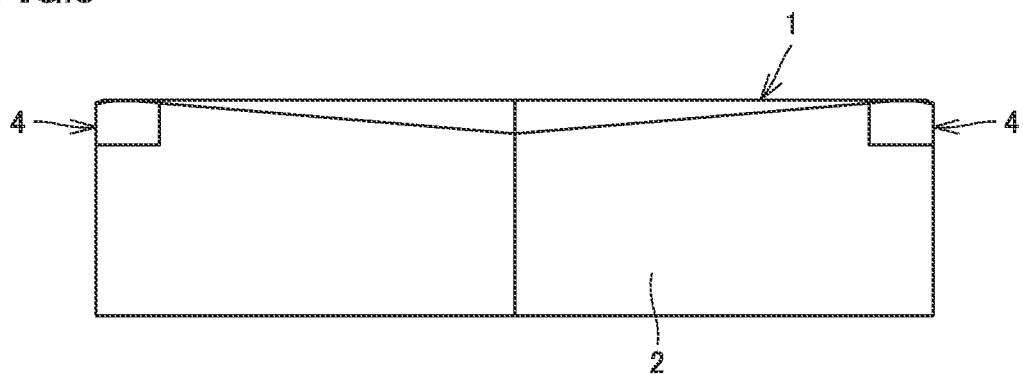
FIG. 3 is a side view on an obtuse angle corner side of the cutting insert in FIG. 1.
Figure 4:
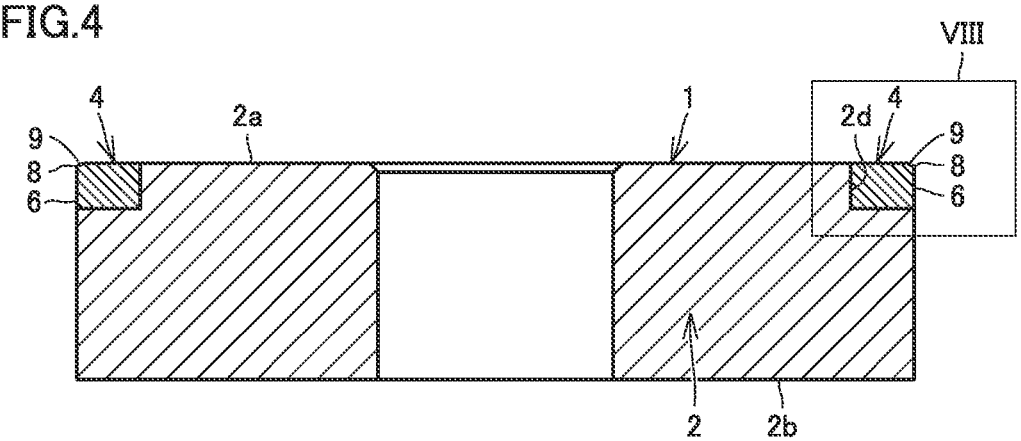
FIG. 4 is a cross-sectional view along the diagonal line of an acute angle corner of the cutting insert in FIG. 1.
Figure 5:
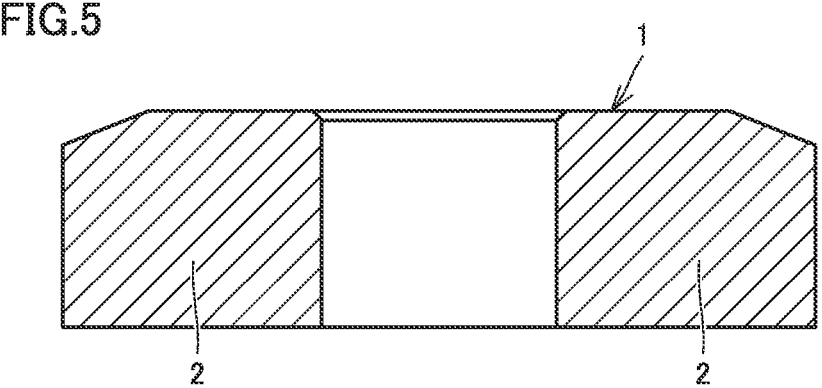
FIG. 5 is a cross-sectional view along the diagonal line of an obtuse angle corner of the cutting insert in FIG. 1.
Figure 6:
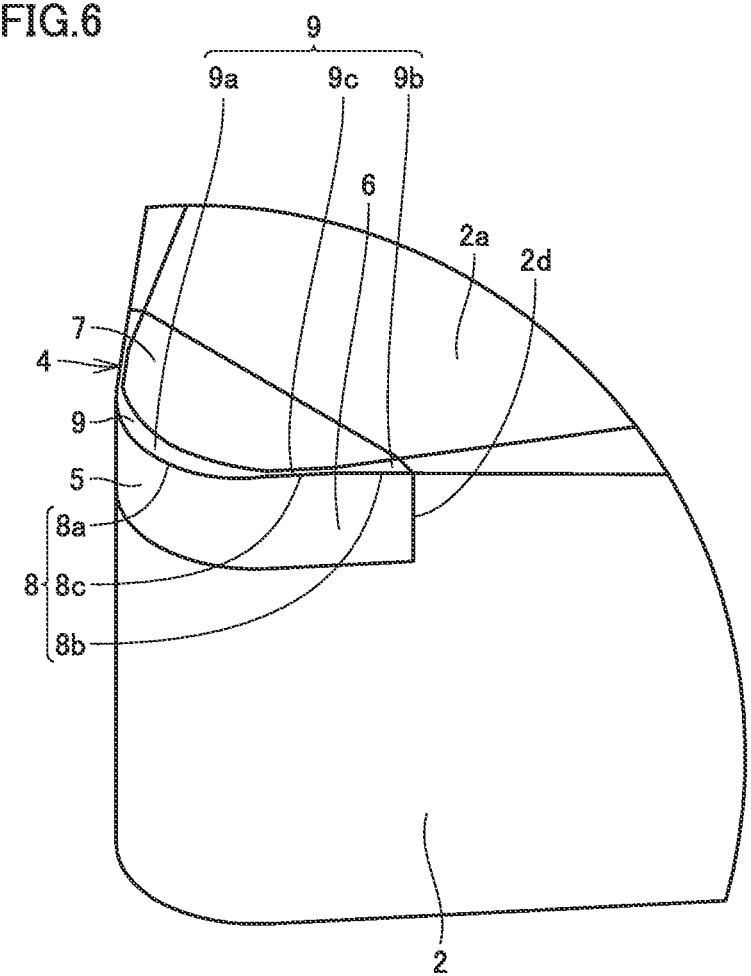
FIG. 6 is an enlarged perspective view around the nose R portion of the cutting insert indicated by VI in FIG. 2.

Next, as indicated by the chain line in FIG. 21, axis O of chuck 11 is tilted relative to the rotational axis of the grinding wheel. In this state, the ridgeline portion at which the top face and the side face of cutter material precursor 4A intersect is brought into contact with the end face of grinding wheel 12, and chuck 11 is moved along the ridgeline portion. This motion can form a chamfer. At this time, by changing the attitude of the chuck, the chamfer can be formed such that: in chamfer 9a for push cutting, the width of chamfer gradually decreases from the nose R portion toward connecting chamfer 9c; in connecting chamfer 9c, the width of chamfer is minimum; and in chamfer 9b for pull cutting, the width of chamfer gradually increases with distance from connecting chamfer 9c, for example. At the same time, as shown in FIG. 1 and FIG. 2, a chamfered portion 10 non-uniform in width can be formed also in base metal 2, where chamfered portion 10 is continuous with chamfer 9b for pull cutting, the width of chamfered portion 10 gradually increasing with distance from the edge corner portion.

Next, with chuck 11 continuously holding blank material 1A, rake face 7 is formed by grinding by changing the attitude of the chuck. Thus, a cutting insert in one aspect of the present disclosure can be produced.

For a blank material where small-piece cutter material precursor 4A is joined to base metal 2 in such a manner that the top face of cutter material precursor 4A projects above the top face of base metal 2, the following method can be used: cutter material precursor 4A is joined to base metal 2 having top face 2a and bottom face 2b ground beforehand, then only the top face of cutter material precursor 4A is ground into rake face 7, and then grinding is performed to form nose R portion 5 and flank face 6, also for side face 2c of the base metal.

According to the above-described manufacturing method, grinding of the flank face, the chamfer, and the rake face can be performed without re-catching the blank material. This prevents shifting of the grinding position that would be caused by re-catching of the blank material. Further, since grinding of the rake face is performed lastly so that grinding is performed substantially on the cutter material, a so-called sagging (distortion and deformation) of the machining surface in simultaneous cutting of the base metal is not generated. This allows efficient, accurate formation of an ideal cutting edge profile that reduces the thrust force component and the feed force component of the cutting resistance.

The edge ridgeline portion can be round-honed, if necessary, to be improved in strength. The width of the round honing surface is preferably about 0.01 mm to 0.3 mm, and more preferably about 0.01 mm to 0.06 mm for preventing deterioration in sharpness that would be caused by excessive blunting.

Embodiment 2

Cutting insert 1 shown in FIG. 9 to FIG. 16 is the same in configuration as that of embodiment 1 except that rake face 7 has a positive rake angle. The difference from embodiment 1 is hereinafter described.

A cutting insert in one aspect of the present disclosure includes a rake face having a positive rake angle. The rake face does not necessarily have to have a positive rake angle over its entire face, but may partially have a positive rake angle at least at the portion that relates to cutting.

Figure 16:
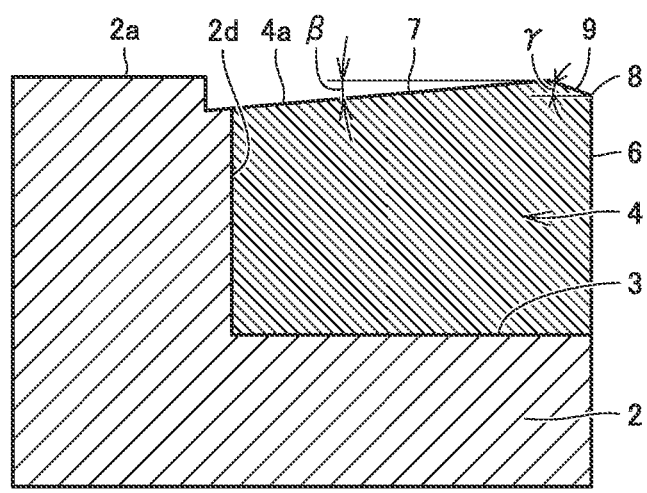
FIG. 16 is an enlarged view of the portion indicated by XVI in FIG. 12.

As shown in FIG. 16, the rake angle β relative to a line parallel to top face 2a at the cross section bisecting the apex angle of the nose R portion is preferably not less than 1° and not more than 10°, and more preferably not less than 1° and not more than 7°. Setting the rake angle to this range can both reduce chattering and improve the fracture resistance of the edge.

Next, a specific example of a method for manufacturing a cutting insert in one aspect of the present disclosure is described. The method for manufacturing a cutting insert in embodiment 2 includes the same steps as those of embodiment 1 except for forming a rake angle in a rake face. The difference from embodiment 1 is hereinafter described.

First, a flank face is formed by grinding in a cutter material of a blank material in the same way as embodiment 1. Then, as indicated by the chain line in FIG. 21, axis O of chuck 11 is tilted relative to the rotational axis of the grinding wheel. In this state, the ridgeline portion at which the top face and the side face of cutter material 4 intersect is brought into contact with the end face of grinding wheel 12, and chuck 11 is moved along the ridgeline portion. This motion can form a preparatory chamfer 9A.

The preparatory chamfer is formed so that a preparatory chamfer corresponding to each of a chamfer for push cutting, a chamfer for pull cutting, and a connecting chamfer has a width as described below.

As the preparatory chamfer corresponding to the chamfer for push cutting, formed is a land having a uniform width and greater than or equal to the maximum width of the chamfer for push cutting.

Figure 9:
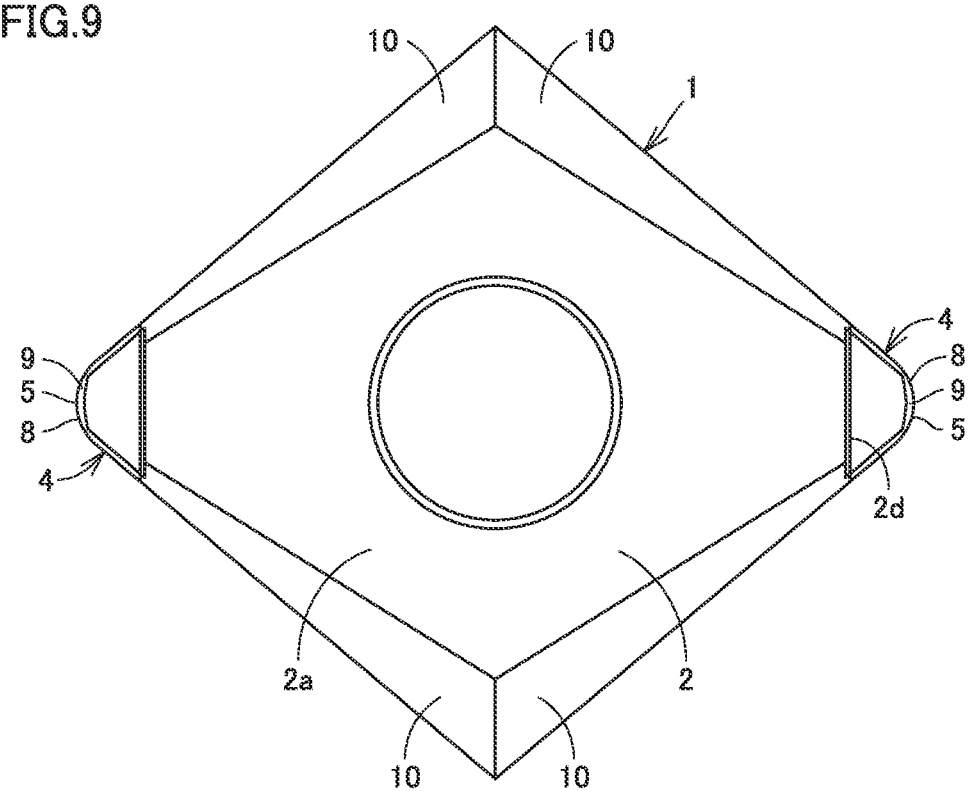
FIG. 9 is a plan view showing another example of a cutting insert in one aspect of the present disclosure.
Figure 10:
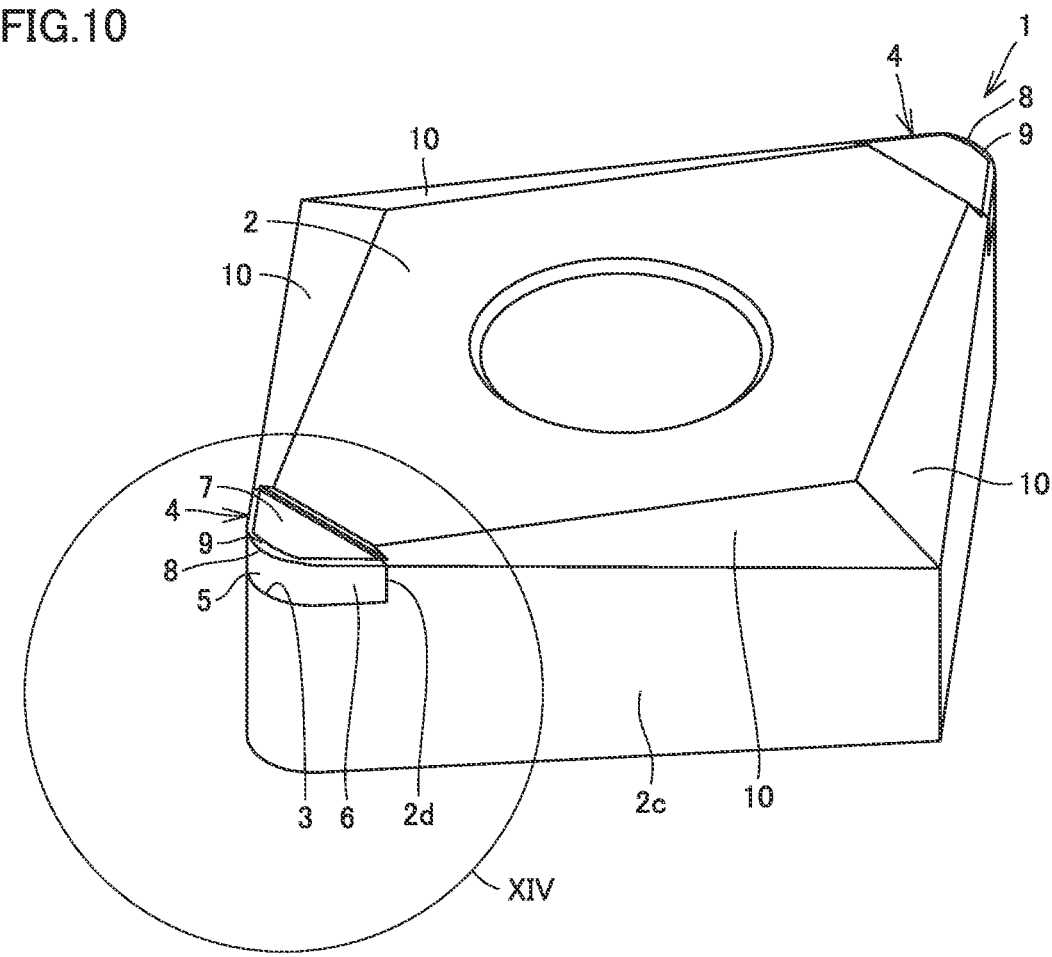
FIG. 10 is a perspective view of the cutting insert in FIG. 9.
Figure 11:
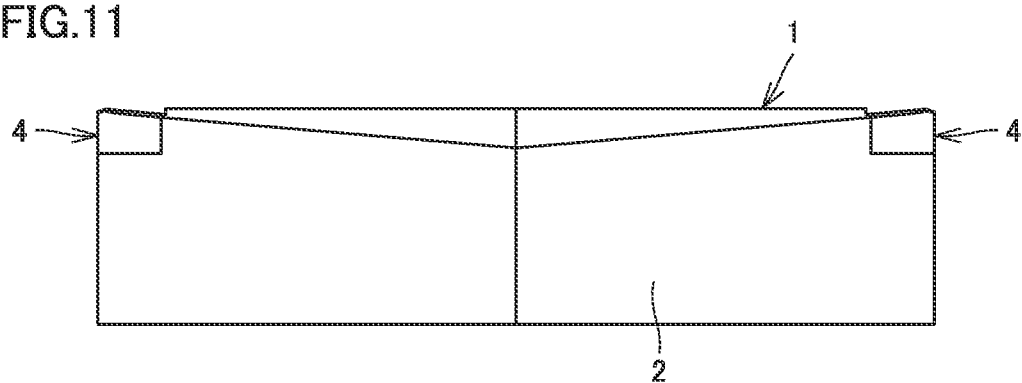
FIG. 11 is a side view on an obtuse angle corner side of the cutting insert in FIG. 9.
Figure 12:
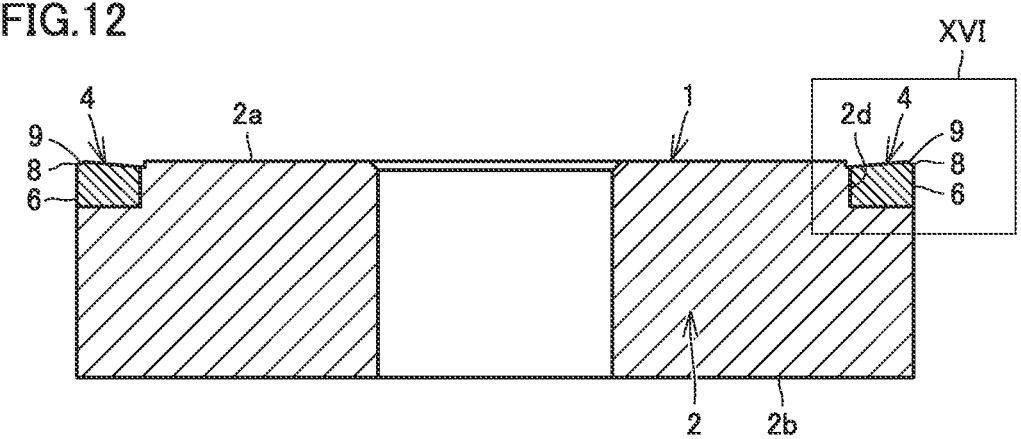
FIG. 12 is a cross-sectional view along the diagonal line of an acute angle corner of the cutting insert in FIG. 9.
Figure 13:
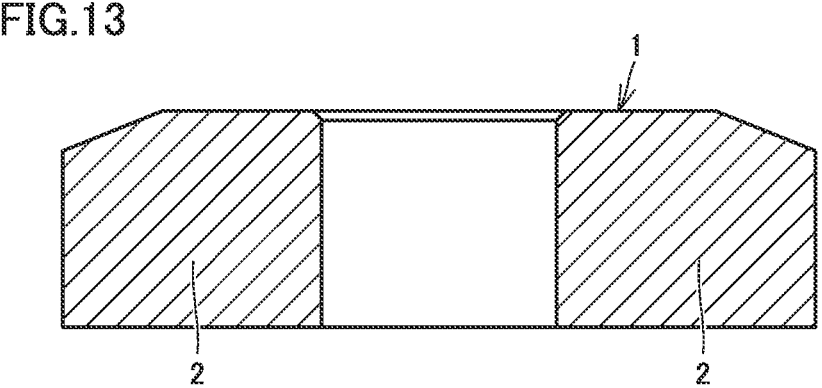
FIG. 13 is a cross-sectional view along the diagonal line of an obtuse angle corner of the cutting insert in FIG. 9.
Figure 14:
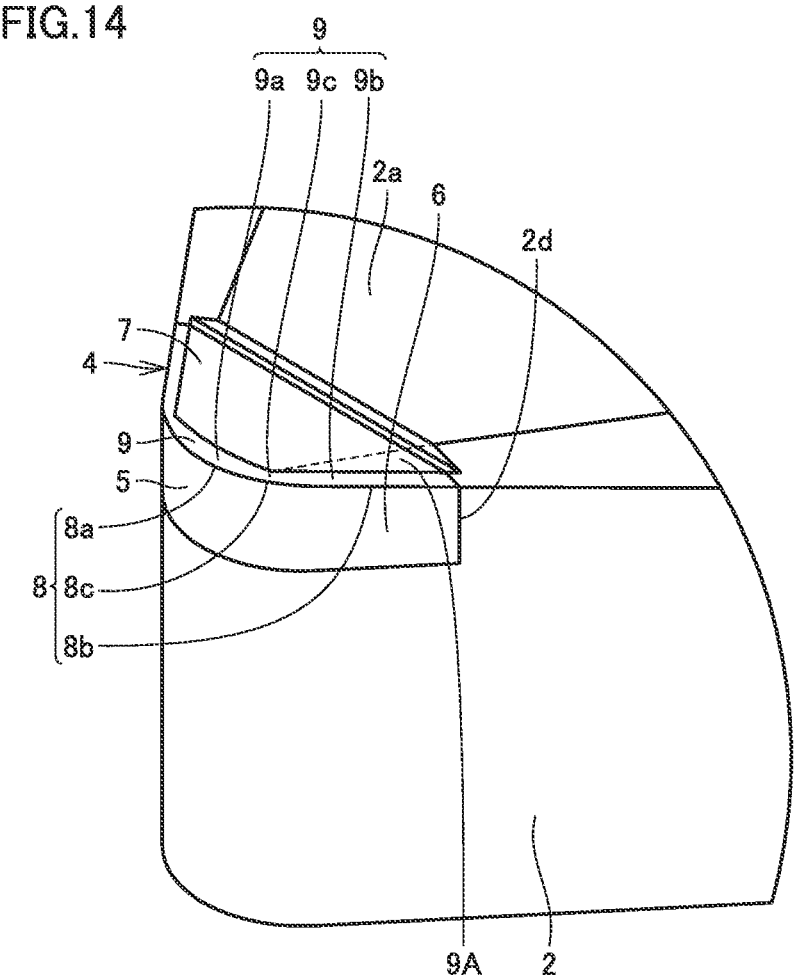
FIG. 14 is an enlarged perspective view around the nose R portion of the cutting insert indicated by XIV in FIG. 10.
Figure 15:
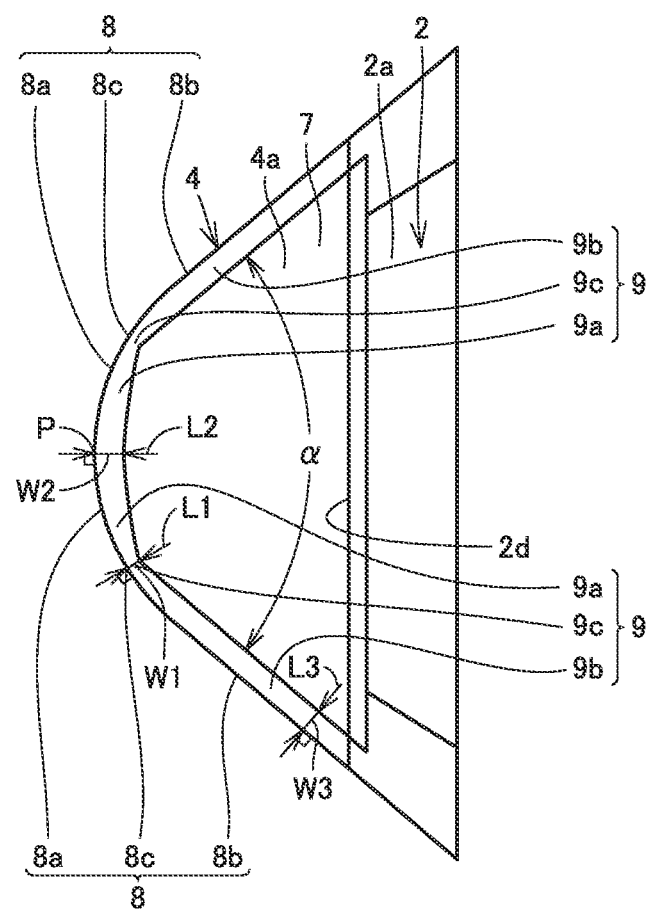
FIG. 15 is an enlarged plan view around the nose R portion of the cutting insert in FIG. 9.

As the preparatory chamfer corresponding to the chamfer for pull cutting, formed is a land having a width greater than or equal to the maximum width of the chamfer for pull cutting and increasing with distance from the nose R portion. At this time, as shown in FIG. 9 and FIG. 10, chamfered portion 10 non-uniform in width is preferably formed also in base metal 2, where chamfered portion 10 is continuous with the preparatory chamfer corresponding to the chamfer for pull cutting, the width of chamfered portion 10 gradually increasing with distance from the edge corner portion.

As the preparatory chamfer corresponding to the connecting chamfer, formed is a preparatory chamfer having a width greater than or equal to the maximum width of the connecting chamfer and increasing with distance from the nose R portion, so that the land width is uniform when a rake is formed. Alternatively, the preparatory chamfer corresponding to the connecting chamfer may be the boundary between the preparatory chamfer corresponding to the chamfer for push cutting and the preparatory chamfer corresponding to the chamfer for pull cutting.

Next, with chuck 11 continuously holding blank material 1A, rake face 7 is formed by grinding by changing the attitude of the chuck.

In grinding of rake face 7, the end face of grinding wheel 12 is tilted in the direction such that a positive rake angle is formed in the rake face (in the direction such that the depth of cut is greater on the side remote from a corner of cutter material 4) and is pressed against a flat top face 4a of cutter material 4. Thus, a part of the preparatory chamfer is removed along with the surface of top face 4a at the same time as machining of rake face 7, and the preparatory chamfer is changed into chamfer 9 having a non-uniform width varying as desired. By the above-described step, a cutting insert in one aspect of the present disclosure can be produced.

EXAMPLES

The present embodiment is described more specifically by examples. The present embodiment, however, is not limited to the examples.

[Samples 1 to 22]

Cutting inserts were manufactured by way of experiment by applying cutter materials having the features listed in the cutting insert specifications in Table 1 to the surface of a corner portion of base metal that relates to cutting. The cutting was evaluated under the following conditions.

For each of samples 1 to 15, 21, and 22, as a cutter material precursor, cBN sintered material was prepared by mixing cBN powder and binder powder composed of TiN and Al by ball mill, and sintering the mixture under the condition of 5 GPa, 1500° C. using an ultra-high pressure apparatus. The cBN sintered material contained 60% by volume of cBN particle having an average particle diameter of 1 μm, the balance including: Ti compound containing TiN as a main component; a compound, such as nitride, boride, oxide of Al or Si; and a small quantity of W and/or Co compound.

For sample 16, as a cutter material precursor, ceramics was prepared containing 70% by mass of $Al_2O_3$ and 30% by mass of TiC.

For sample 17, as a cutter material precursor, cermet was prepared containing 60% by mass of TiC and 20% by mass of WC, the balance including Co.

For each of samples 18 to 20, as a cutter material precursor, cemented carbide was prepared containing 2% by mass of TaC and 10% by mass of Co, the balance including WC.

Next, a blank material was prepared by joining a small-piece cutter material precursor to a cemented carbide base metal for ISO CNGA120408 by brazing. The blank material was ground into a thickness of 4.80 mm by simultaneously cutting the bottom and top faces of the blank material together with the cutter material precursor with a surface grinder. Then, automatically grinding was performed with a grinder to form a nose R portion, an insert side face, and a flank face. During outer-periphery grinding, the angle at which the outer periphery forming the two-side flank face defining the nose R portion was pressed against the grinding wheel was adjusted. Thus, a blank material having an apex angle of 80° and a flank angle of 0° was produced. The flank angle refers to the angle indicating the tilt of the flank face relative to the top face.

These blank materials were ground into cutting inserts having the features listed in Table 1, using a grinding machine 400COMBI manufactured by Agathon AG. For each sample, the distance along the cutting edge portion for push cutting between the apex of the nose R portion cutting edge and the connecting cutting edge portion was 0.6 mm, the length of the connecting cutting edge portion was 0.05 mm, and the length of the cutting edge portion for pull cutting was 2.0 mm.

Each of the cutting inserts held on a tool holder having the following cutting geometry was used to cut the following workpiece under the following conditions. The accuracy of dimension after the machining and the cutting time before the edge was fractured were evaluated.

(Cutting Geometry)
Cutting edge tilt angle=−5°
Lateral rake angle=−5°
Front flank angle=5°
Lateral flank angle=5°
Front cutting edge angle=5°
Lateral cutting edge angle=−5°
(Workpiece)
Workpiece: heat-treated JIS SUJ2 (ASTM52100)
Workpiece shape: φ50 disc for end face machining, and φ30 round bar for outer-periphery machining
(Cutting Conditions)
Workpiece hardness: HRc 60 to 62
Cutting speed V=150 mm/min
Depth of cut d=0.15 mm
Feed rate f=0.15 mm/rev
Coolant: none
Machining mode: end face machining (push cutting in the down arrow direction in FIG. 22) was performed, and then outer-periphery machining (pull cutting in the right arrow direction in FIG. 22) was performed.

The accuracy of dimension after machining was determined by measuring, with a micrometer, the diameter of a round bar for outer-periphery machining three minutes after the start of cutting, and measuring the absolute value of the difference from a target dimension (φ29.700). In the present example, an accuracy of dimension after machining of not more than 30 μm was evaluated to be high.

The results are summarized in Table 1.

TABLE 1

| | | cutting insert specifications | | | | | | | | cutting results | |
|---|---|---|---|---|---|---|---|---|---|---|---|
| sample No. | material | rake angle β (°) | connecting negative land width W1 (mm) | ratio of negative land width W2/W1 | ratio of negative land width W3/W1 | negative land width W2 for push cutting (mm) | negative land width W3 for pull cutting (mm) | nose R radius (mm) | negative land angle γ (°) | R honing (mm) | accuracy of dimension after machining (μm) | cutting time before fracture (min) |
| 1 | cBN sintered material | 5 | 0.05 | 2 | 2 | 0.10 | 0.10 | 0.8 | 25 | 0 | 10 | 15.6 |
| 2 | cBN sintered material | 5 | 0.02 | 2 | 2 | 0.04 | 0.04 | 0.8 | 25 | 0 | 6 | 9.6 |
| 3 | cBN sintered material | 5 | 0.30 | 2 | 2 | 0.60 | 0.60 | 0.8 | 25 | 0 | 24 | 35.1 |
| 4 | cBN sintered material | 5 | 0.05 | 1.2 | 2 | 0.06 | 0.10 | 0.8 | 25 | 0 | 9 | 14.1 |
| 5 | cBN sintered material | 5 | 0.05 | 2 | 1.2 | 0.10 | 0.06 | 0.8 | 25 | 0 | 8 | 14.3 |
| 6 | cBN sintered material | 5 | 0.05 | 10 | 2 | 0.50 | 0.10 | 0.8 | 25 | 0 | 13 | 16.1 |
| 7 | cBN sintered material | 5 | 0.05 | 2 | 10 | 0.10 | 0.50 | 0.8 | 25 | 0 | 14 | 16.5 |
| 8 | cBN sintered material | 0 | 0.05 | 2 | 2 | 0.10 | 0.10 | 0.8 | 25 | 0 | 19 | 20.4 |
| 9 | cBN sintered material | 1 | 0.05 | 2 | 2 | 0.10 | 0.10 | 0.8 | 25 | 0 | 17 | 18.2 |
| 10 | cBN sintered material | 10 | 0.05 | 2 | 2 | 0.10 | 0.10 | 0.8 | 25 | 0 | 4 | 10.1 |

TABLE 1-continued cutting insert specifications

| sample No. | material | rake angle β (°) | connecting negative land width W1 (mm) | ratio of negative land width W2/W1 | ratio of negative land width W3/W1 | negative land width W2 for push cutting (mm) | negative land width W3 for pull cutting (mm) | nose R radius (mm) | negative land angle γ (°) | R honing (mm) | accuracy of dimension after machining (μm) | cutting time before fracture (min) |
|---|---|---|---|---|---|---|---|---|---|---|---|---|
| 11 | cBN sintered material | 5 | 0.05 | 2 | 2 | 0.10 | 0.10 | 0.4 | 25 | 0 | 7 | 13.1 |
| 12 | cBN sintered material | 5 | 0.05 | 2 | 2 | 0.10 | 0.10 | 1.2 | 25 | 0 | 16 | 17.1 |
| 13 | cBN sintered material | 5 | 0.05 | 2 | 2 | 0.10 | 0.10 | 0.8 | 15 | 0 | 6 | 12.9 |
| 14 | cBN sintered material | 5 | 0.05 | 2 | 2 | 0.10 | 0.10 | 0.8 | 35 | 0 | 16 | 22.1 |
| 15 | cBN sintered material | 5 | 0.05 | 2 | 2 | 0.10 | 0.10 | 0.8 | 25 | 0.01 | 12 | 16.2 |
| 16 | ceramics | 5 | 0.05 | 2 | 2 | 0.10 | 0.10 | 0.8 | 25 | 0 | 21 | 7.1 |
| 17 | cermet | 5 | 0.05 | 2 | 2 | 0.10 | 0.10 | 0.8 | 25 | 0 | 24 | 8.2 |
| 18 | cemented carbide | 5 | 0.30 | 1 | 1 | 0.30 | 0.30 | 0.8 | 25 | 0 | unmeasurable due to fracture | 0.5 |
| 19 | cemented carbide | 5 | 0.02 | 1 | 1 | 0.02 | 0.02 | 0.8 | 25 | 0 | unmeasurable due to fracture | 0.5 |
| 20 | cemented carbide | 5 | 0.30 | 2 | 2 | 0.60 | 0.60 | 0.8 | 25 | 0 | unmeasurable due to fracture | 0.5 |
| 21 | cBN sintered material | 0 | 0.30 | 1 | 1 | 0.30 | 0.30 | 0.8 | 25 | 0 | 37 | 19.8 |
| 22 | cBN sintered material | 0 | 0.02 | 1 | 1 | 0.02 | 0.02 | 0.8 | 25 | 0 | 5 | 3.2 |

In the cutting insert of each of samples 1 to 17, the cutter material was made of cBN sintered material, ceramics, or cermet, and width W1 of the connecting chamfer was smaller than maximum value W2 of width of the chamfer for push cutting and maximum value W3 of width of the chamfer for pull cutting. Each of these cutting inserts showed high accuracy of dimension after machining, a long cutting time before fracture, and a long tool life. Although one composition was examined for each of cBN sintered material, ceramics, and cermet in the present example, the composition is not limited to these. Cutting inserts produced with other common compositions of cBN sintered material, ceramics, and cermet also show high accuracy of dimension after machining and a long tool life in the same cutting test as described above.

In the cutting insert of each of samples 18 to 20, the cutter material was made of cemented carbide, the value of W2/W1 was not less than 1 and not more than 2, and the value of W3/W2 was not less than 1 and not more than 2. Each of these cutting inserts showed a short cutting time before fracture. Due to the fracture of the cutting insert in a short time, the workpiece could hardly machined and thus the accuracy of dimension after machining could not be measured.

In the cutting insert of sample 21, the cutter material was made of cBN sintered material, and the value of width W1, maximum value W2 of width, and maximum value W3 of width were all 0.3 mm. This cutting insert showed low accuracy of dimension after machining. In the cutting insert of sample 22, the cutter material was made of cBN sintered material, and the value of width W1, maximum value W2 of width, and maximum value W3 of width were all 0.02 mm. This cutting insert showed a short time before fracture.

It should be construed that the embodiments and examples disclosed herein are given by way of example in every respect, not by way of limitation. It is intended that the scope of the present invention is defined not by the above-described embodiments but by the terms of claims, and includes any modification within the meaning and scope equivalent to the terms of claims.

REFERENCE SIGNS LIST

1: cutting insert; 1A: blank material; 2: base metal; 2a: top face; 2b: bottom face; 2c: side face; 2d: joint surface; 3: seat; 4: cutter material; 4A: cutter material precursor; 4a: top face; 5: nose R portion; 6: flank face; 7: rake face; 8: cutting edge; 8a: cutting edge portion for push cutting; 8b: cutting edge portion for pull cutting; 8c: connecting cutting edge portion; 9: chamfer; 9a: chamfer for push cutting; 9b: chamfer for pull cutting; 9c: connecting chamfer; 9A: preparatory chamfer; 10: chamfered portion; 11: chuck; 11a: plug gauge; 12: grinding wheel; 26A, 26B: front cutting edge portion; 27A, 27B: lateral cutting edge portion; 28: covering layer; P: apex of nose R portion cutting edge

The invention claimed is:

1. A cutting insert having a surface that relates to cutting, the surface comprising cBN sintered material, ceramics, or cermet, the cutting insert comprising:

a rake face;
   a flank face;
   a chamfer located between the rake face and the flank face;
   a cutting edge formed by a ridgeline at which the flank face and the chamfer intersect; and
   a nose R portion,
   the cutting edge comprising
      a cutting edge portion for push cutting,
      a cutting edge portion for pull cutting, and
      a connecting cutting edge portion located between the cutting edge portion for push cutting and the cutting edge portion for pull cutting,
   in the chamfer located along the cutting edge, the chamfer located along the connecting cutting edge portion having a minimum width,
   wherein a width W1 of the chamfer located along the connecting cutting edge portion is not less than 0.02 mm and not more than 0.3 mm,
   wherein a maximum value W3 of width of the chamfer located along a region within 1.5 mm from the connecting cutting edge portion along the cutting edge portion for pull cutting, and the width W1 satisfy a relationship in a formula (2) below:

$$2 \leq W3/W1 \leq 10 \quad \text{formula (2)},$$

the cutting edge portion for push cutting is a region located between an apex of the cutting edge of the nose R portion and the connecting cutting edge portion, the cutting edge portion for pull cutting is a region extending from the connecting cutting edge portion in the direction away from the nose R portion, an edge of the chamfer intersects the rake face along a length of the chamfer including at least the nose R portion, and the rake face located along the chamfer that is located along the cutting edge portion for push cutting does not have a chip breaker.

2. The cutting insert according to claim 1, wherein a maximum value W2 of width of the chamfer located along the cutting edge portion for push cutting, and the width W1 satisfy a relationship in a formula (1) below:

$$2 \leq W2/W1 \leq 10 \qquad \text{formula (1)}.$$

3. The cutting insert according to claim 1, wherein the rake face has a positive rake angle, and the rake angle $\beta$ is not less than 1° and not more than 10°, at a cross section bisecting an apex angle of the nose R portion.

4. The cutting insert according to claim 1, wherein the cutting insert comprises a cutter material and a base metal, the cutter material comprises cBN sintered material, ceramics, or cermet, and the cutter material comprises the rake face, the flank face, the chamfer, and the cutting edge.

5. The cutting insert according to claim 1, wherein a distance along the cutting edge portion for push cutting between the apex of the cutting edge of the nose R portion and the connecting cutting edge portion is not less than 0.1 mm and not more than 3.0 mm, and a length of the connecting cutting edge portion is not more than 2.0 mm.

* * * * *

UNITED STATES PATENT AND TRADEMARK OFFICE
CERTIFICATE OF CORRECTION

PATENT NO. : 11,338,371 B2
APPLICATION NO. : 16/344193
DATED : May 24, 2022
INVENTOR(S) : Hironari Moroguchi It is certified that error appears in the above-identified patent and that said Letters Patent is hereby corrected as shown below:

In the Claims

Claim 1, Column 16, Line 64, "$2 \leq W3/W1 \leq 10$" should read -- $1.2 \leq W3/W1 \leq 10$ --.

Claim 2, Column 17, Line 15, "$2 \leq W2/W1 \leq 10$" should read -- $1.2 \leq W2/W1 \leq 10$ --.

Signed and Sealed this
Twenty-third Day of August, 2022

Katherine Kelly Vidal
*Director of the United States Patent and Trademark Office*